United States Patent [19]
Oshimi et al.

[11] Patent Number: 5,943,123
[45] Date of Patent: Aug. 24, 1999

[54] OPTICAL FIBER MONITOR USING OPTICAL TIME DOMAIN REFLECTOMETER AND MONITORING METHOD

[75] Inventors: Takashi Oshimi; Kiyoshi Iwasaki, both of Isehara; Norio Nakayama; Shigeo Hori, both of Atsugi, all of Japan

[73] Assignee: Anritsu Corporation, Tokyo, Japan

[21] Appl. No.: 09/029,232

[22] PCT Filed: Jul. 24, 1997

[86] PCT No.: PCT/JP97/02556

§ 371 Date: Mar. 19, 1998

§ 102(e) Date: Mar. 19, 1998

[87] PCT Pub. No.: WO98/04895

PCT Pub. Date: Feb. 5, 1998

[30] Foreign Application Priority Data

Jul. 25, 1996 [JP] Japan ................................. 8-214330

[51] Int. Cl.[6] .................................................. G01N 21/00
[52] U.S. Cl. ............................................................ 356/73.1
[58] Field of Search .................................. 356/73.1, 351; 359/110, 127, 177

[56] References Cited

U.S. PATENT DOCUMENTS

| | | | |
|---|---|---|---|
| 5,202,754 | 4/1993 | Sorin et al. | 356/73.1 |
| 5,668,627 | 9/1997 | Minami | 356/73.1 |
| 5,767,956 | 6/1998 | Yoshida | 356/73.1 |
| 5,790,285 | 8/1998 | Mock | 356/73.1 |

FOREIGN PATENT DOCUMENTS 2-129529  5/1990  Japan .
2-132338  5/1990  Japan .

OTHER PUBLICATIONS

H. Takasugi et al; "Testing Method for In–Service Line of Optical Subscriber Loops with Optical Time Domain Reflectometer"; 1993; pp. 311–320; B–I, vol. J76–B–I.

*Primary Examiner*—Hoa Q. Pham
*Assistant Examiner*—Tu T. Nguyen
*Attorney, Agent, or Firm*—Frishauf, Holtz, Goodman, Langer & Chick, P.C.

[57] ABSTRACT

First to fourth initial data memories 31a to 31d prestore initial data R obtained when a reference optical fiber 22 having a predetermined length was previously measured, and initial data Pa to Pc obtained when a to-be-monitored optical fiber was previously measured. A first arithmetic unit 33 finds a difference α between measurement data R' obtained when the reference optical fiber 22 is newly measured and the initial data R as a first drift amount representing a variation in characteristics of the OTDR itself. A second arithmetic unit 34 finds a difference β between measurement data P' obtained when the to-be-monitored optical fiber 1 is newly measured and the initial data of the to-be-monitored optical fiber as a second drift amount representing a variation in characteristics of the OTDR itself and characteristics of the to-be-monitored optical fiber 1. A third arithmetic unit 35 finds, from a difference between β and α, a real characteristic variation amount γ of the to-be-monitored optical fiber 1 as a third drift amount representing a variation in characteristics of the to-be-monitored optical fiber 1. A waveform comparator 36 detects the presence/absence of abnormality of the to-be-monitored optical fiber 1 based on the real characteristic variation amount γ of the to-be-monitored optical fiber 1.

13 Claims, 5 Drawing Sheets

OPTICAL FIBER MONITOR USING OPTICAL TIME DOMAIN REFLECTOMETER AND MONITORING METHOD

TECHNICAL FIELD

The present invention relates generally to an optical fiber monitoring apparatus and method, and more particularly to an optical fiber monitoring apparatus and method using an optical time domain reflect meter (OTDR) which supplies a light pulse into an optical fiber for use in a communication cable, etc., receives light returning from the optical fiber, and detects a defect, etc. of the optical fiber on the basis of the received signal, thereby preventing a deterioration of the precision in detecting the defect, which deterioration occurs due to a variation in performance of the OTDR itself resulting from a change in ambience.

BACKGROUND ART

An optical pulse test device called an optical time domain reflect meter (OTDR) has generally been used in the prior art to detect a defect, etc. of an optical fiber used as a communication cable, etc.

FIG. 8 shows a structure of a conventional optical time domain reflect meter (OTDR) 10 for testing the optical fiber, as described above.

The optical time domain reflect meter (OTDR) 10 comprises a light pulse generator 11 for outputting pulse-like light, a light receiver 12, and an optical coupler 14 for guiding a light pulse output from the light pulse generator 11 to an optical fiber 1 to be tested via an optical connector 13 and also guiding to the receiver 12 the light (backward scattering light or Fresnel reflection light) returning from the optical fiber 1 toward the optical connector 13.

In the optical time domain reflect meter (OTDR) 10, an output signal from the light receiver 12, which has been obtained in a predetermined time period since the light pulse was output from the light pulse generator 11, is processed to generate a measurement signal corresponding to transmission characteristics of the optical fiber 1 in the distance direction of the fiber. A waveform level of the measurement signal is plotted on a time axis (a distance axis) on a monitor screen.

The user compares the waveform displayed on the monitor screen and a waveform measured in advance when the optical fiber was laid out and thus finds a position on the optical fiber where abnormality has occurred. Thus, the defect of the optical fiber is detected and repaired.

In the above-described conventional optical time domain reflect meter (OTDR) 10, however, the user is unable to distinguish a loss increased due to only abnormality on the optical fiber side from a signal level variation on the OTDR body side due to a change in ambience, for example, a drift due to characteristics of the OTDR itself, such as a signal level variation resulting from an output variation of the pulse generator or an amplification degree variation of the light receiver. Consequently, the user may erroneously determine a defect of the optical fiber.

Besides, in the above-described optical time domain reflect meter (OTDR), the user compares the waveform displayed on the monitor screen and a waveform measured in advance when the optical fiber was laid out and thus finds a position on the optical fiber where abnormality has occurred. Thus, the defect of the optical fiber is detected. With this optical time domain reflect meter (OTDR) alone, it is not possible to perform an automatic monitor operation aiming at detecting a defect, etc. of the optical fiber.

DISCLOSURE OF THE INVENTION

An object of the present invention is to solve the above problems and to provide an optical fiber monitoring apparatus using an OTDR for detecting a defect, etc. of an optical fiber and being capable of exactly performing an automatic monitoring operation for an optical fiber to be monitored, even if there is a drift due to characteristics of the OTDR itself, such as a signal level variation on the OTDR body side due to a change in ambience.

Another object of the present invention is to solve the above problems and to provide an optical fiber monitoring method using an OTDR for detecting a defect, etc. of an optical fiber and being capable of exactly performing an automatic monitoring operation for an optical fiber to be monitored, even if there is a drift due to characteristics of the OTDR itself, such as a signal level variation on the OTDR body side due to a change in ambience.

According to the present invention, there is provided an optical fiber monitoring apparatus comprising:

an optical time domain reflect meter (OTDR) (23–27, 30) for delivering an optical pulse to an optical fiber and outputting a measurement signal corresponding to transmission characteristics of the optical fiber in a distance direction, based on a light reception output of return light from the optical fiber;

arithmetic means (31, 33, 34, 35) for finding in advance a drift amount due to a variation in characteristics of the optical fiber, which is included in the measurement signal output from the OTDR; and determination means (32) for determining whether a difference between the initial measurement signal of the optical fiber measured by the OTDR and an actual measurement signal of the optical fiber falls within a predetermined allowable range.

According to the present invention, there is also provided an optical fiber monitoring apparatus for detecting abnormality of a to-be-monitored optical fiber, comprising:

a reference optical fiber (22) having a predetermined length;

an optical pulse generator (24) for delivering optical pulses to the reference optical fiber and the to-be-monitored optical fiber;

a light receiver (25) for receiving light returning from the reference optical fiber and the to-be-monitored optical fiber to which the optical pulses have been delivered from the optical pulse generator;

first arithmetic means (33) for finding a drift amount of the optical fiber monitoring apparatus by using each of reference signals output from the light receiver for receiving the returning light from the reference optical fiber to which the optical pulses have been delivered from the optical pulse generator at different times;

second arithmetic means (34, 35) for correcting, with use of the drift amount found by the first arithmetic means, a difference between measurement signals output from the light receiver for receiving the returning light from the to-be-monitored optical fiber to which the optical pulses have been delivered from the optical pulse generator at different times; and determination means (32) for monitoring whether the difference between the measurement signals then output from the light receiver for receiving the returning light from the to-be-monitored optical fiber, to which the optical pulses have been delivered from the optical pulse generator at different times, falls within a predetermined allowable range determined with reference to the drift amount corrected by the second arithmetic means.

According to the invention, there is also provided an optical fiber monitoring method for detecting abnormality of a to-be-monitored optical fiber by using an optical fiber monitoring apparatus, the method comprising:

a step of preparing a reference optical fiber having a predetermined length;

receiving light returning from the reference optical fiber, to which an optical pulse has been delivered within a certain time period, to obtain a first reference signal, and receiving light returning from the to-be-monitored optical fiber, to which an optical pulse has been delivered within a certain time period, to obtain a first measurement signal;

receiving light returning from the reference optical fiber, to which an optical pulse has been delivered within a subsequent time period, to obtain a second reference signal, and receiving light returning from the to-be-monitored optical fiber, to which an optical pulse has been delivered within a certain time period, to obtain a second measurement signal;

calculating a drift amount of the optical fiber monitoring apparatus by using the first and second reference signals;

correcting, with use of the drift amount, a difference between the first and second measurement signals; and monitoring whether the difference between the measurement signals in a subsequent time falls within the predetermined allowable range determined with reference to the correct drift amount.

BEST MODE OF CARRYING OUT THE INVENTION

An embodiment of an optical fiber monitoring apparatus and method according to the present invention will now be described with reference to the accompanying drawings.

Figure 1:
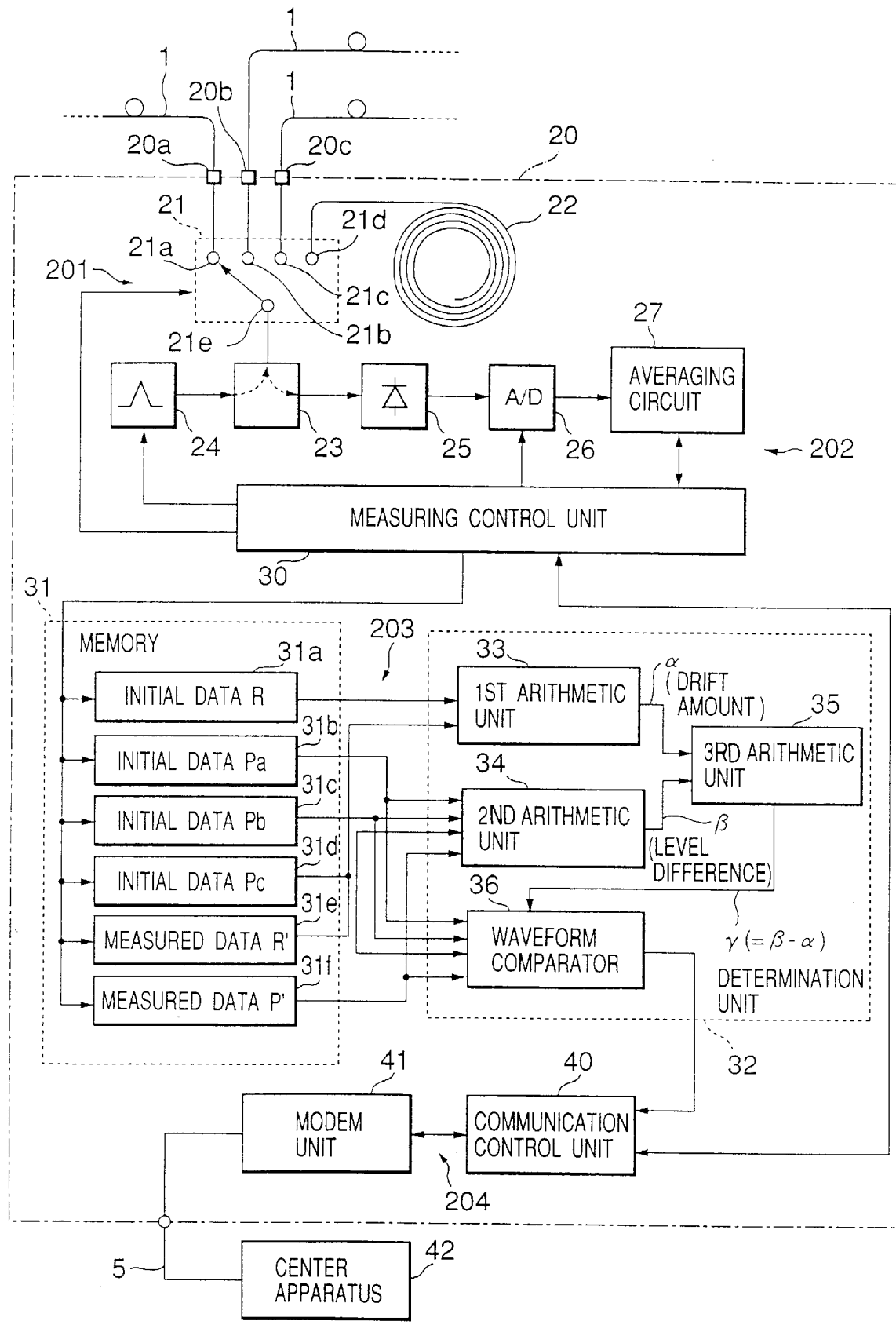
FIG. 1 is a block diagram showing a construction of an embodiment of an optical fiber monitoring apparatus and method according to the present invention.

FIG. 1 shows a structure of an optical fiber monitoring apparatus 2 according to an embodiment of the present invention.

The optical fiber monitoring apparatus 2 cooperates with a center apparatus 42 connected thereto via a telephone line 5, thereby constituting an optical fiber monitoring system for monitoring a number of optical fibers in a centralized manner.

The optical fiber monitoring apparatus 20 receives schedule information from the center apparatus 42 and, according to the schedule information, automatically performs monitoring and measuring of the optical fibers. Thus, the optical fiber monitoring apparatus 20 detects a breakage or a defect of the optical fibers, and sends the detected result to the center apparatus 42.

The optical fiber monitoring apparatus 20 generally comprises an optical fiber connection change-over section 201, an OTDR section 202, a storage/arithmetic section 203, and a communication section 204.

The optical fiber connection change-over section 201 of optical fiber monitoring apparatus 20 is provided with three connectors 20a, 20b and 20c for connection with external optical fibers 1 to be monitored.

The connectors 20a to 20c are connected to a one-to-four optical switch 21.

Predetermined non-used or in-service optical fibers in optical fiber cables each comprising optical fibers laid out as communication lines are connected, as optical fibers 1 to be monitored, to the connectors 20a to 20c via optical filters (not shown).

The technique for connecting in-service optical fibers as to-be-monitored optical fibers 1 with use of optical filters is described in detail in "In-service Optical Line Characteristics Testing Method Using Optical Pulse Tester", Papers of the Institute of Electronics, Information and Communications Engineering, B-1, Vol. J75-B-1, No. 3, pp. 311–320.

The optical switch 21 comprises four connection terminals 21a to 21d and one change-over terminal 21e. A change-over signal is supplied from a measuring control unit 30 (described later) to the optical switch 21 to optically connect one of the connection terminals 21a to 21d to the change-over terminal 21e. The three connection terminals 21a to 21c of optical switch 21 are connected to the connectors 20a to 20c by means of optical fibers.

The connection terminal 21d of optical switch 21 is connected to one end of a reference optical fiber 22 having a predetermined length (e.g. 50 m) and already known attenuation characteristics, etc. The other end of the reference optical fiber 22 is opened within the optical fiber monitoring apparatus 20.

The change-over terminal 21e of optical switch 21 is connected to an optical pulse generator 24 and a light receiver 25 via an optical coupler 23 constituting a part of the OTDR section 202.

The optical coupler 23 outputs an optical pulse, which is output from the optical pulse generator 24, to the change-over terminal 21e of optical switch 21 and also supplies the light, which returns to the optical coupler 23 from the change-over terminal 21e, to the light receiver 25.

The light receiver 25 outputs a light reception signal, which corresponds to the intensity of the received light, to an analog/digital (A/D) converter 26.

The A/D converter 26 converts the light reception signal output from the light receiver 25 to a digital signal and outputs the digital signal to an averaging circuit 27.

When an optical pulse is output by a predetermined number of times (e.g. 10 times) to one optical fiber connected to the optical switch 21, the averaging circuit 26 averages a series of light reception signal data which is obtained at each time, based on the predetermined number of times, and outputs the averaged result to the measuring control unit 30.

Specifically, in the averaging circuit 27, a series of light reception signal data, which is output from the A/D converter 26 during a time period from the output timing of the first optical pulse to the end of a predetermined time, is stored in an internal memory (not shown) in the order of addresses. In addition, light reception signal data associated with the second optical pulse is added to the previous light reception signal data stored in the internal memory.

If the averaging circuit 27 completes a predetermined number of times of this operation, the data accumulated in the internal memory is averaged by dividing the data by a value corresponding to the predetermined number of times. The averaged light reception data is output to the measuring control unit 30 as a result of measurement of the optical fiber by the OTDR.

The measuring control unit 30, along with a memory 31 (described later) of the storage/arithmetic section 203, constitutes first to fourth memory means according to this embodiment.

Specifically, the measuring control unit 30 controls, according to schedule information delivered from the center apparatus 42, the optical switch 21, optical pulse generator 24, A/D converter 26 and averaging circuit 27. Thereby, the measuring control unit 30 enables the OTDR section 202 to perform, for example, periodically, the measurement of the reference optical fiber 22 and the to-be-monitored optical fibers 1 connected to the respective connection terminals of optical switch 21. In addition, the measuring control unit 30 enables the memory 31 to store the light reception signal data averaged by the averaging circuit 27 in association with the respective connection terminals.

The measuring control unit 30 may, according to an operational instruction from an operation unit (not shown), enable the OTDR section 202 to perform the measurement of the reference optical fiber 22 and a chosen to-be-monitored optical fiber 1 and enable the memory 31 to store the measured result as initial data.

Moreover, the measuring control unit 30 may be built in the optical fiber monitoring apparatus 20 as a microprocessor (CPU) or may be replaced with a personal computer (PC) connected outside the optical fiber monitoring apparatus 20.

In other words, the measuring control unit 30 may execute the above-described control functions with use of software.

The memory 31 comprises a first initial data memory 31a for prestoring, as initial data, light reception signal data of reference optical fiber 22, which was initially measured at the time of the manufacture of the optical fiber monitoring apparatus according to the present embodiment; second to fourth initial data memories 31b to 31d for storing, as initial data, light reception signal data of the to-be-monitored fibers 1, which were initially measured at the time of connection of the to-be-measured optical fibers 1; a first measured data memory 31e for storing light reception signal data of the reference optical fiber 22 which is newly measured for the purpose of monitoring; and a second measured data memory 31f for storing light reception signal data of the to-be-monitored optical fibers 1 which are newly measured for the purpose of monitoring.

A determination unit 32 connected to the memory 31 comprises a first arithmetic unit 33, a second arithmetic unit 34, a third arithmetic unit 35 and a waveform comparator 36.

The determination unit 32 determines the presence/absence of breakage or deterioration of each to-be-monitored optical fiber 1 based on the light reception signal data stored in the memories 31a to 31f of the memory 31.

The first arithmetic unit 33 finds as a drift amount $\alpha$ a level difference between the light reception signal data stored in the first measured data memory 31e and the initial data stored in the first initial data memory 31a.

The level difference representing the drift amount $\alpha$ is a difference between those data items among the data stored in both memories 31a and 31e, which have the same address corresponding to the position where the influence of connector reflection of the reference optical fiber 22 is small.

The drift amount $\alpha$, as described later, is considered to occur mainly due to variations in characteristics of the inside of the OTDR section 202, for example, a level variation in output light from the optical pulse generator 24, a variation in amplification degree of the light receiver 25, and degradation by loss at the input side including the optical switch 21.

Thus, the drift amount $\alpha$ is substantially defined to be a first drift amount representing a variation in characteristics of the inside of the OTDR section 202.

The second arithmetic unit 34 finds a level difference $\beta$ between the light reception signal data of the to-be-monitored optical fiber 1, which was measured for the purpose of monitoring and stored in the second measured data memory 31f, and the initial data corresponding to the to-be-monitored optical fiber 1 among the initial data stored in the second to fourth initial data memories 31b to 31d.

This level difference is a difference between data items at the same address corresponding to the position where there is no influence of connector reflection of the to-be-monitored optical fiber 1.

The level difference $\beta$ and the above-mentioned drift amount $\alpha$ are not limited to a level difference of a specific address value, but may be an average value of level differences of a plurality of address values.

The level difference $\beta$ is substantially defined to be a second drift amount representing a variation in characteristics of the inside of the OTDR section 202 and characteristics of the to-be-monitored optical fiber 1.

The third arithmetic unit 35 subtracts the drift amount $\alpha$ found by the first arithmetic unit 33 from the level difference $\beta$ found by the second arithmetic unit 34 and outputs the subtracted result as a real level difference $\gamma$.

The real level difference $\gamma$ is substantially defined to be a third drift amount representing a variation in characteristics of the to-be-monitored optical fiber 1.

The waveform comparator 36 performs waveform comparison between the light reception signal data of the to-be-monitored optical fiber 1, which was measured for the purpose of monitoring and stored in the second measured data memory 31f, and the initial data of the to-be-monitored optical fiber 1 which is stored in any one of the second to fourth initial data memories 31b to 31d, based on the real level difference $\gamma$ obtained by the third arithmetic unit 35, i.e. the third drift amount representing the variation in characteristics of the to-be-monitored optical fiber 1. The waveform comparator 36 thus detects the presence/absence of abnormality of the to-be-monitored optical fiber 1.

Specifically, the waveform comparator 36 detects the presence/absence of abnormality of the to-be-monitored optical fiber 1 by finding, as difference data at each address, a difference between the light reception signal data of the to-be-monitored optical fiber 1, which is stored in the second measured data memory 31f, and the initial data of the to-be-monitored optical fiber 1, and determining whether this difference data falls outside an allowable range γ±L set for the real level difference γ, i.e. the third drift amount representing the variation in characteristics of the to-be-monitored optical fiber 1.

When this difference data falls outside the allowable range γ±L set for the real level difference γ, i.e. the third drift amount representing the variation in characteristics of the to-be-monitored optical fiber 1, the waveform comparator 36 finds the address position of the difference data and finds the position of the defect of the to-be-monitored optical fiber 1 from this address position.

On the other hand, a communication control unit 40, which is a part of the communication section 204, delivers the determination result of the determination unit 32 to the center apparatus 42 via a MODEM unit 41, and also sets the schedule information sent from the center apparatus 42 in the measuring control unit 30.

The center apparatus 42 is connected to a plurality of optical fiber monitoring apparatuses 20 over telephone lines, and receives abnormality position information, etc. of to-be-monitored optical fibers 1 from the optical fiber monitoring apparatuses 20. Thus, the center apparatus 42 instructs repairing processes to proper organizations.

Figure 2:
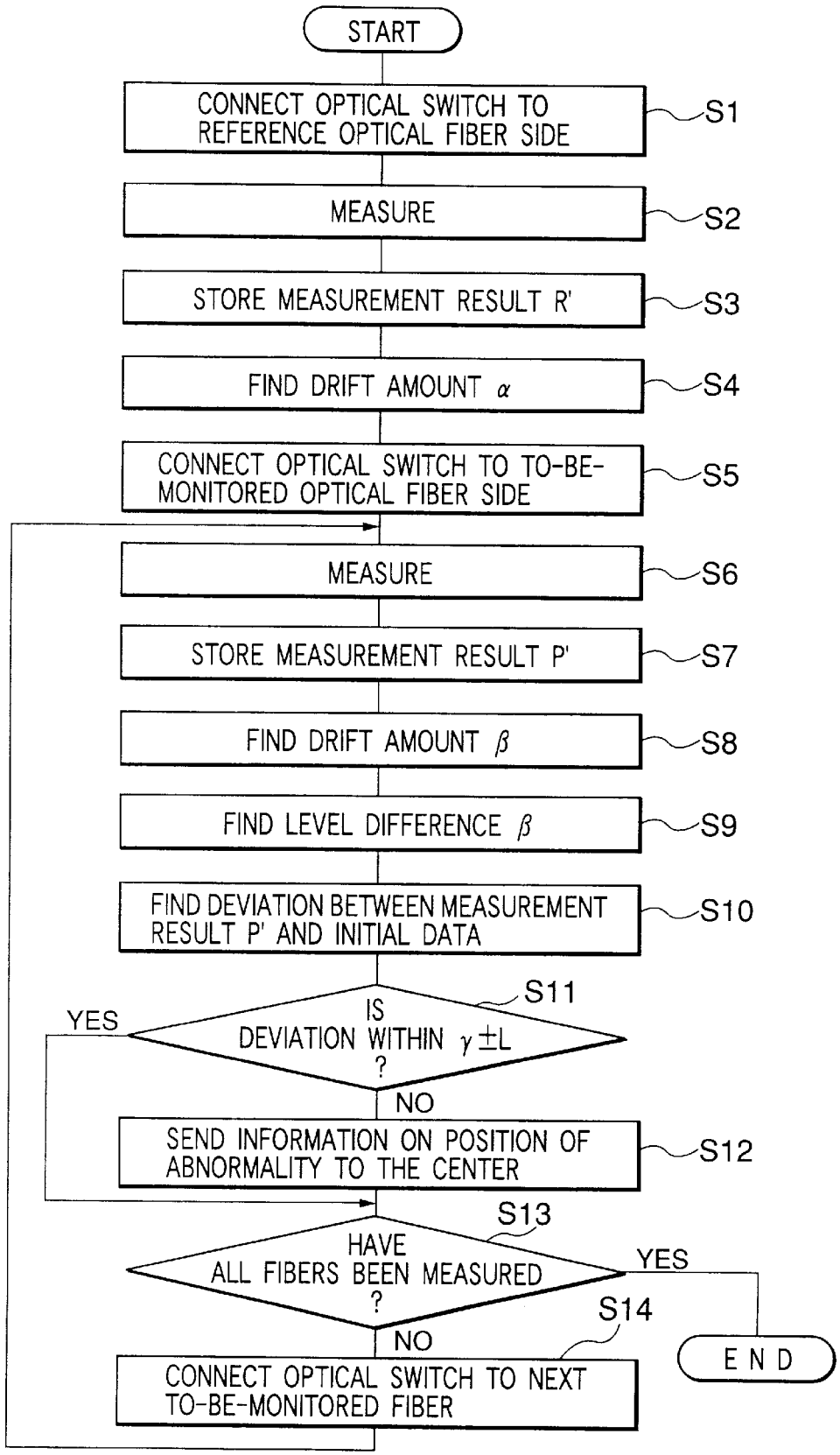
FIG. 2 is a flow chart illustrating a processing procedure of the optical fiber monitoring apparatus and method according to the embodiment of the invention.

FIG. 2 is a flow chart illustrating an example of the processing procedure of the optical fiber monitoring apparatus 20 and monitoring method.

With reference to this flow chart, the operation of the optical fiber monitoring apparatus 20 and monitoring method will now be described according to the processing procedure.

Figure 3:
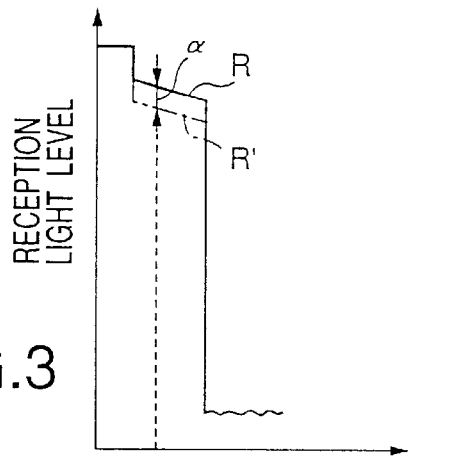
FIG. 3 shows an example of a measured result of a reference optical fiber, which was obtained by the optical fiber monitoring apparatus and method according to the embodiment of the invention.

Suppose that the first initial data memory 31a prestores initial data of the reference optical fiber 22, as indicated by R in FIG. 3.

Figure 4:
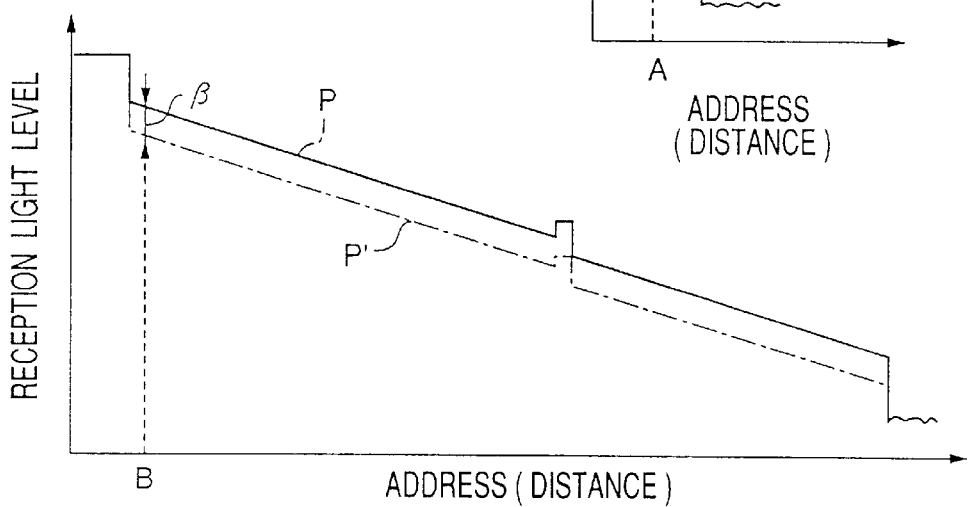
FIG. 4 shows an example of a measured result of an optical fiber to be monitored, which was obtained by the optical fiber monitoring apparatus and method according to the embodiment of the invention.

In addition, suppose that the second initial data memory 31b, for example, of the second to fourth initial data memories 31b to 31d prestores initial data of the to-be-monitored optical fiber 1, as indicated by P in FIG. 4.

At first, the optical switch 21 is connected to the reference optical fiber 22. Thus, the OTDR section 202 performs measurement of the reference optical fiber 22 (steps S1 and S2).

If light reception signal data, as indicated by R' in FIG. 3, is obtained by the measurement, the light reception signal data R' is stored in the first measured data memory 31e (step S3).

Then, a difference between the reception light signal data R' at a specific address position A and the initial data R at address position A stored in the first initial data memory 31a is calculated by the first arithmetic unit 33 as a drift amount α, i.e. the first drift amount representing a variation in characteristics of the inside of the OTDR section 202 (step S4).

Since a time-basis variation of characteristics of the reference optical fiber 22 disposed within the apparatus is ignorably small, the drift amount α can be considered to occur mainly due to variations in characteristics of the inside of the OTDR section 202, for example, a level variation in output light from the optical pulse generator 24, a variation in amplification degree of the light receiver 25, and degradation by loss at the input side including the optical switch 21.

It is considered that the influence of the first drift amount (α) due to the characteristics of the OTDR section 202 itself is included in the measured result of each to-be-monitored optical fiber 1.

The optical switch 21 is then connected to the connection terminal 20a and the OTDR section 202 performs measurement of the to-be-monitored optical fiber 1 connected to the connection terminal 20a (steps S5 and S6).

If light reception signal data, as indicated by P' in FIG. 4, is obtained by the measurement, the light reception signal data P' is stored in the second measured data memory 31b (step S7).

Then, a difference between the reception light signal data R' at a specific address position B and the initial data R at address position B stored in the first initial data memory 31a is calculated by the second arithmetic unit 34 as a level difference β, i.e. the second drift amount representing a variation in characteristics of the inside of the OTDR section 202 itself and characteristics of the to-be-monitored optical fiber 1 (step S8).

The third arithmetic unit 35 subtracts the first drift amount (α) representing the variation in characteristics of the OTDR 202 itself from the level difference (β), i.e. the second drift amount (β) representing the variation in characteristics of the OTDR section 202 itself and characteristics of the to-be-monitored optical fiber 1. Thus, the third arithmetic unit 35 calculates a real level difference γ representing a variation in characteristics of the to-be-monitored optical fiber 1, i.e. the third drift amount (γ) representing the variation in characteristics of to-be-monitored optical fiber 1, which is obtained by subtracting the first drift amount (α) representing the variation in characteristics of the OTDR 202 itself from the second drift amount (β) representing the variation in characteristics of the OTDR section 202 itself and characteristics of the to-be-monitored optical fiber 1 (step S9).

The waveform comparator 36 finds, as difference data, a difference at each address between the light reception signal data P' and the initial data P in the second initial data memory 31b and determines whether this difference data falls outside an allowable range γ±L set for the third drift amount (γ) representing the variation in characteristics of the to-be-monitored optical fiber 1 (steps S10 and S11).

Figure 5:
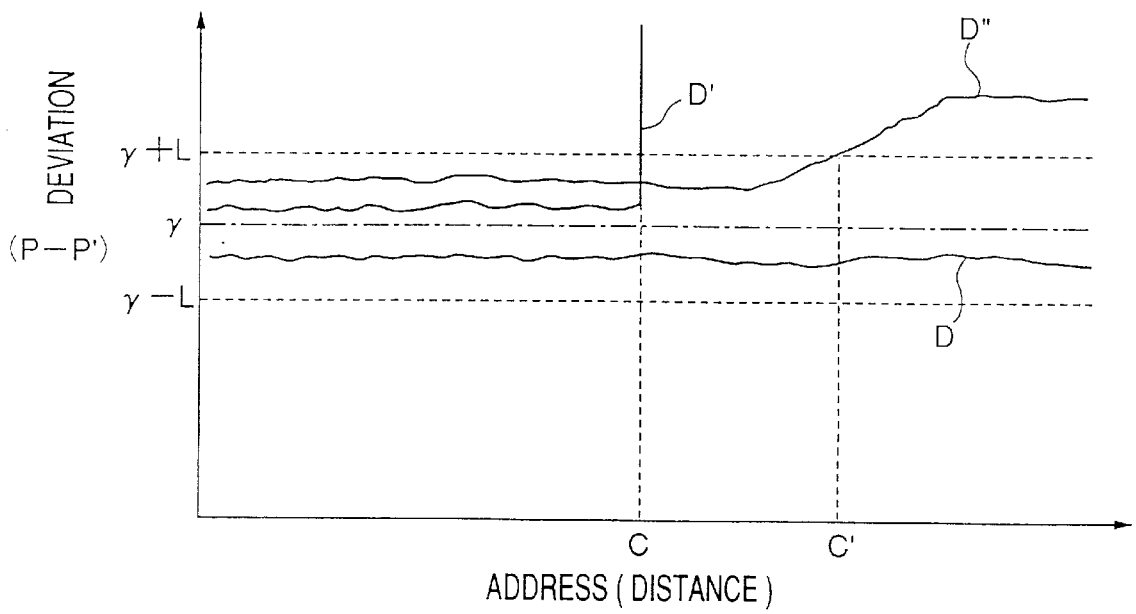
FIG. 5 shows an example of deviation data obtained by the optical fiber monitoring apparatus and method according to the embodiment of the invention.

For example, if the difference data between the light reception signal data P' and initial data P is within the allowable range γ±L, as indicated by D in FIG. 5, it is determined that there is no defect in the to-be-monitored optical fiber 1.

If the difference data between the light reception signal data PI and initial data P sharply falls outside the allowable range γ±L at an address C, as indicated by D' in FIG. 5, it is determined that there is a breakage in the to-be-monitored optical fiber 1 at the position corresponding to the address C.

If the difference data between the light reception signal data P' and initial data P varies gently and falls outside the allowable range γ±L at an address C', as indicated by D" in FIG. 5, it is determined that there is a deterioration in the to-be-monitored optical fiber 1 near the position corresponding to the address C'.

When the occurrence of the defect in the to-be-monitored optical fiber 1 has thus been detected by the waveform comparator 36, the information on the position of the defect in the to-be-monitored optical fiber 1 is obtained and the obtained information is sent to the center apparatus 42 via the communication control unit 40 and MODEM unit 41 (step S12).

The measurement and determination for the other to-be-monitored optical fibers 1 will be performed similarly (steps S13 and S14).

For example, after a predetermined time period from the completion of the measurement and determination for all the to-be-monitored optical fibers 1, the process of steps S1 to S14 is repeated, if necessary.

The above-described processing procedure is based on the schedule information from the center apparatus 42. However, the processing procedure is not limited to this.

For example, after the reference optical fiber 22 has been measured, all the to-be-monitored optical fibers 1 are measured and the measured data is stored. Then, abnormality may be determined.

Alternatively, the measurement of the reference optical fiber 22 may be conducted, for example, once per day. Based on the first drift amount ($\alpha$) obtained by the measurement, the second drift amount ($\beta$) and third drift amount ($\gamma$) are found. These amounts are used for the determination the occurrence of defects in to-be-monitored optical fibers 1 which is to be performed in the same day.

As has been described above, in the optical fiber monitoring apparatus 20 according to this embodiment, the presence/absence of abnormality of the to-be-monitored optical fiber 1 is determined based on the third drift amount ($\gamma$) representing the variation in characteristics of the to-be-monitored optical fiber 1, which is obtained by subtracting the first drift amount ($\alpha$) representing the variation in characteristics of the OTDR 202 itself, which is obtained by measuring the reference optical fiber 22, from the second drift amount ($\beta$) representing the variation in characteristics of the OTDR section 202 itself and characteristics of the to-be-monitored optical fiber 1. That is, the presence/absence of abnormality is determined based on the third drift amount ($\gamma$) which is obtained by correcting, by the first drift amount ($\alpha$), the second drift amount ($\beta$) representing the level variation amount of the measured data of the to-be-monitored optical fiber 1.

Thereby, the optical fiber monitoring apparatus according to this embodiment can exactly monitor the to-be-monitored optical fiber 1, without erroneously determining abnormality of the to-be-monitored optical fiber 1 even if there is a drift of signal level variation, etc. due to the internal characteristics of the OTDR section resulting from an ambient change, etc.

The optical fiber monitoring apparatus according to this embodiment performs the measurement of the reference optical fiber 22 and to-be-monitored optical fibers 1 and the determination of abnormality according to the schedule information from the center apparatus 42. Then, the result is sent to the center apparatus 42. However, the present invention is not limited to this structure.

For example, the present invention can be applied, without changing the spirit thereof, to an optical fiber monitoring apparatus including an OTDR which can be singly used and includes an operation section for setting measurement conditions, etc. and a display for displaying a measurement result and determination result.

In the above embodiment, the reference optical fiber 22 is provided separately from the to-be-monitored optical fibers 1, and the measurement for the reference optical fiber 22 and the measurement for the to-be-monitored optical fibers 1 are performed at different timings. However, the invention is not limited to this structure.

Figure 6:
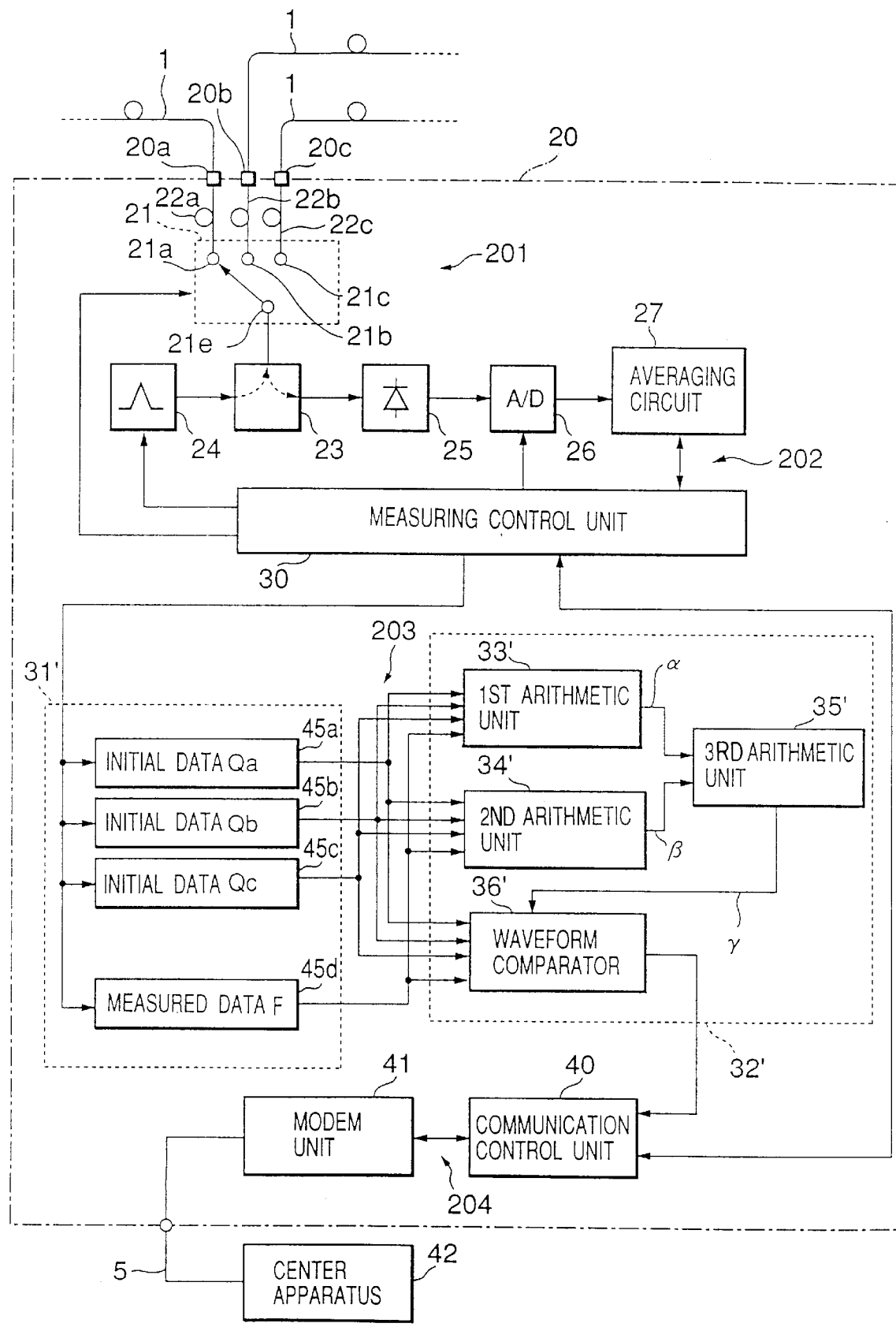
FIG. 6 is a block diagram showing a construction of another embodiment of an optical fiber monitoring apparatus and method according to the present invention.

For example, in an optical fiber monitoring apparatus 20' according to another embodiment as shown in FIG. 6, reference optical fibers 22a to 22c are connected in series to to-be-monitored optical fibers 1, and the measurement for the reference optical fibers 22a to 22c and that for the to-be-monitored optical fibers 1 are performed at the same timing.

Specifically, in the optical fiber monitoring apparatus 20' the connection terminals 21a to 21c of optical switch 21 and the connectors 20a to 20c are connected by means of the reference optical fibers 22a to 22c each having a predetermined length (e.g. 50 m).

First to third initial data memories 45a, 45b and 45c of the memory 31' store, as initial data, data Qa, Qb and Qc which are initially measured in the state in which the to-be-monitored optical fibers 1 are connected to the connectors 20a to 20c.

In the optical fiber monitoring apparatus 20' according to the other embodiment shown in FIG. 6, the parts common to those of the optical fiber monitoring apparatus 20 according to the embodiment shown in FIG. 1 are denoted by like reference numerals with dash ('), and a description thereof is omitted.

Figure 7:
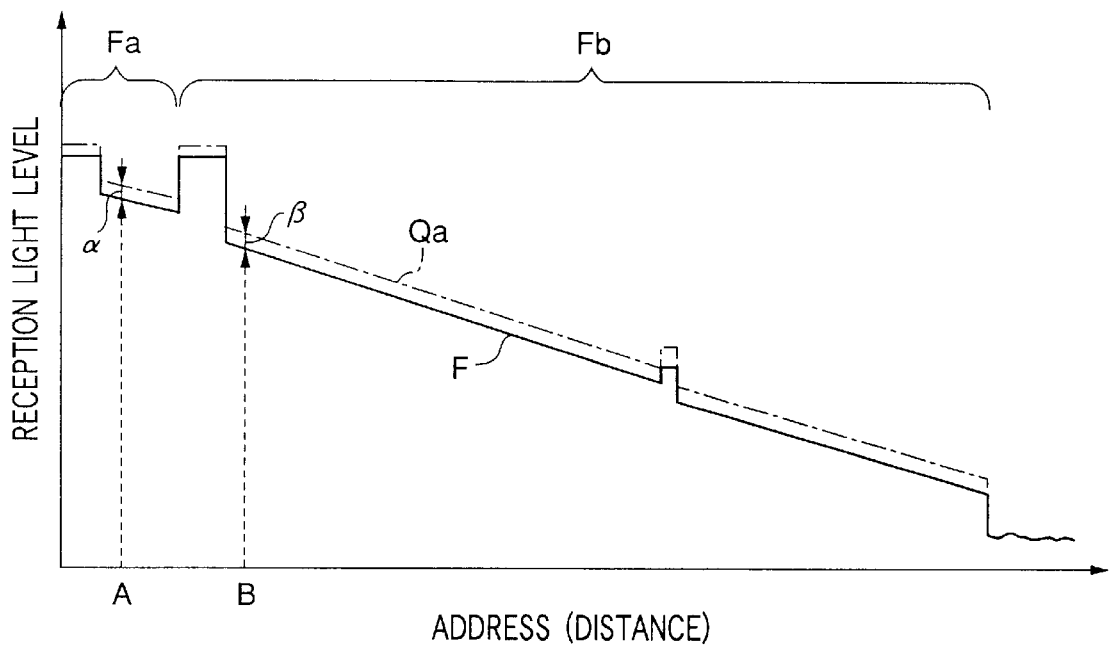
FIG. 7 shows an example of a measured result according to the embodiment of the invention as shown in FIG. 6.
Figure 8:
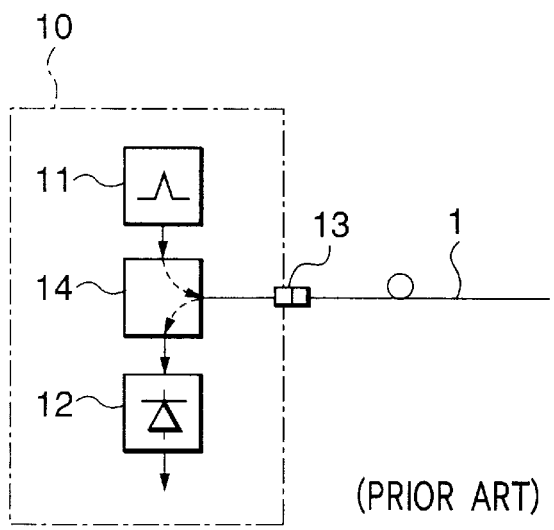
FIG. 8 shows a structure of a conventional optical time domain reflect meter apparatus (OTDR).

Suppose that in the above-described initialized state the optical switch 21 was connected to, for example, the connection terminal 21a to measure the to-be-monitored optical fiber 1, and light reception signal data F as shown in FIG. 7 was stored in a measured data memory 45d.

In this case, the first arithmetic unit 33' finds a level difference at an address A between the light reception signal data F and the initial data Qa stored in the initial data memory 45a, i.e. a level difference of measured data portion Fa due to reflection of the reference optical fiber 22a as shown in FIG. 7, as a drift amount $\alpha$, i.e. a first drift amount representing a variation in characteristics of the OTDR section 202 itself.

The second arithmetic unit 34' finds a level difference at an address B between the light reception data F and the initial data Qa stored in the initial data memory 45a, i.e. a level difference $\beta$ of measured data portion Fb due to reflection of the to-be-monitored optical fiber 1 connected to the connector 20a as shown in FIG. 7, which is a second drift amount representing a variation in characteristics of the OTDR section 202 itself and characteristics of the to-be-monitored optical fiber 1.

The third arithmetic unit 35' finds a real level variation amount $\gamma$ representing a variation in characteristics of the to-be-monitored optical fiber 1 by subtracting the drift amount $\alpha$ from the level difference $\beta$, that is, a third drift amount representing a variation in characteristics of the to-be-monitored optical fiber 1 which is obtained by subtracting the first drift amount representing the variation in characteristics of the OTDR section 202 itself from the second drift amount representing a variation in characteristics of the OTDR section 202 itself and characteristics of the to-be-monitored optical fiber 1.

The waveform comparator 36' determines whether deviation data between the light reception signal data F and the initial data Qa in the initial data memory 45a in the measured data portion Fb due to reflection of the to-be-monitored optical fiber 1 falls outside an allowable range $\gamma \pm L$ set for the real variation amount $\gamma$ due to the variation in characteristics of to-be-monitored optical fiber 1, i.e. the second drift amount y representing the variation in characteristics of the OTDR section 202 itself and characteristics of the to-be-monitored optical fiber 1. Thereby, the waveform comparator 36' determines the presence/absence of abnormality of the to-be-monitored optical fiber 1 and sends the determination result to the center apparatus 42 via the communication section 204, like the optical fiber monitoring apparatus 20 according to the embodiment shown in FIG. 1.

Like the optical fiber monitoring apparatus 20' according to the other embodiment shown in FIG. 6, if the reference optical fibers 22a to 22c are connected in series to the to-be-monitored optical fibers 1 for measurement, all the terminals of the optical switch 21 can be connected to the to-be-monitored fibers 1 and there is no need to use the optical switch 21 in the case where the number of to-be-monitored optical fibers 1 is one.

Moreover, according to the structure of the optical fiber monitoring apparatus 20' of the other embodiment shown in FIG. 6, no time is required to measure the reference optical fibers 22a to 22c independently. Even if the number of to-be-monitored optical fibers 1 is large, the to-be-monitored optical fibers 1 can be efficiently measured.

The optical fiber monitoring apparatus and method of the present invention are not limited to the above embodiments, and various modifications and applications can be made without departing from the spirit of the invention.

For example, in the above embodiments, memories 31a to 31f, 45a to 45d are independently provided within the memory 31, 31'. However, this invention is not limited to this structure. If memory functions are provided, where necessary, in the arithmetic units 33 to 36, 33' to 36' in the determination unit 32, 32', some of the memories 31a to 31f, 45a to 45d may be dispensed with.

As has been described above, in the optical fiber monitoring apparatus and method according to the embodiments of the invention, a reference optical fiber having a predetermined length is provided and the OTDR device finds, as a drift amount of the OTDR device itself, a difference between a signal obtained by previously measuring the reference optical fiber and a signal newly obtained. The OTDR device corrects, based on this drift amount, a difference between a signal obtained by previously measuring a to-be-monitored optical fiber and a signal obtained by newly measuring it. Based on the corrected signal, the presence/absence of abnormality of the to-be-monitored optical fiber is detected.

Thus, in the optical fiber monitoring apparatus and method according to the embodiments of the invention, when the presence/absence of abnormality of the to-be-monitored optical fiber is to be detected by using the OTDR device, abnormality of the to-be-monitored optical fiber is not erroneously detected even if there is a signal level variation on the OTDR device side due to an ambient change, etc. The to-be-monitored optical fiber can be exactly monitored.

Accordingly, as has been described in detail, the present invention can solve the problems of the prior art and can provide an optical fiber monitoring apparatus and method using an OTDR for detecting a defect, etc. of an optical fiber and being capable of exactly performing an automatic monitoring operation for an optical fiber to be monitored, even if there is a drift due to characteristics of the OTDR itself, such as a signal level variation on the OTDR body side due to a change in ambience.

We claim:

1. An optical fiber monitoring apparatus comprising:
   an optical time domain reflect meter (OTDR) for delivering an optical pulse to an optical fiber and outputting a measurement signal corresponding to transmission characteristics of the optical fiber in a distance direction, based on a light reception output of return light from the optical fiber;
   a first arithmetic unit for, when a reference optical fiber having a predetermined length is connected to the OTDR as said optical fiber, finding a first drift amount due to a variation in characteristics of the OTDR itself based on a difference between an initial measurement signal due to a light reception output of return light from the reference optical fiber and an actual measurement signal of the reference optical fiber;
   a second arithmetic unit for, when a to-be-monitored optical fiber is connected to the OTDR as said optical fiber, finding a second drift amount due to a variation in characteristics of the OTDR itself based on a difference between an initial measurement signal due to a light reception output of return light from the to-be-monitored optical fiber and an actual measurement signal of the to-be-monitored optical fiber;
   a third arithmetic unit for finding a third drift amount due to a variation in characteristics of the to-be-monitored optical fiber based on the first and second drift amounts found by the first and second arithmetic units; and
   a determination unit for determining whether the third drift amount falls within a predetermined allowable range.

2. The optical fiber monitoring apparatus according to claim 1, further comprising a waveform comparator for enabling said first arithmetic unit to find said difference between the initial measurement signal of the reference optical fiber and the actual measurement signal of the reference optical fiber, and for enabling said second arithmetic unit to find said difference between the initial measurement signal of the to-be-monitored optical fiber and the actual measurement signal of the to-be-monitored optical fiber.

3. The optical fiber monitoring apparatus according to claim 1, wherein the reference optical fiber having the predetermined length and the to-be-monitored optical fiber are connected in series as said optical fiber connected to the OTDR.

4. The optical fiber monitoring apparatus according to claim 1, further comprising a memory for storing the initial measurement signal of the to-be-monitored optical fiber and the actual measurement signal of the to-be-monitored optical fiber.

5. The optical fiber monitoring apparatus according to claim 1, further comprising a memory for storing the initial measurement signal of the reference optical fiber and the actual measurement signal of the reference optical fiber.

6. The optical fiber monitoring apparatus according to claim 1, wherein said OTDR comprises:
   an optical pulse generator for delivering optical pulses to the reference optical fiber and the to-be-monitored optical fiber;
   a light receiver for receiving light returning from the reference optical fiber and the to-be-monitored optical fiber to which the optical pulses have been delivered from the optical pulse generator; and
   an optical coupler for delivering the optical pulses from the optical pulse generator to the reference optical fiber and the to-be-monitored optical fiber, and enabling the light receiver to receive the light returning from the reference optical fiber and the to-be-monitored optical fiber.

7. The optical fiber monitoring apparatus according to claim 6, wherein said OTDR further comprises an A/D converter for converting a light reception output from the light receiver to a digital signal;
   an averaging circuit for averaging the digital signal from the A/D converter; and
   a measuring control unit for controlling the optical pulse generator, the A/D converter and the averaging circuit.

8. The optical fiber monitoring apparatus according to claim 7, further comprising an optical switch for delivering the optical pulses from the optical pulse generator to the reference optical fiber and the to-be-monitored optical fiber in a switching manner.

9. The optical fiber monitoring apparatus according to claim 8, wherein said optical switch is switch-controlled by the measuring control unit.

10. An optical fiber monitoring apparatus for detecting abnormality of a to-be-monitored optical fiber, comprising:

a reference optical fiber having a predetermined length;

an optical pulse generator for delivering optical pulses to the reference optical fiber and the to-be-monitored optical fiber;

a light receiver for receiving light returning from the reference optical fiber and the to-be-monitored optical fiber;

a first arithmetic unit for finding a drift amount of the optical fiber monitoring apparatus using reference signals output from the light receiver with respect to returning light from the reference optical fiber to which optical pulses have been delivered from the optical pulse generator at different times;

a second arithmetic unit for correcting, in accordance with the drift amount found by the first arithmetic unit, a difference between measurement signals output from the light receiver with respect to the to-be-monitored optical fiber to which optical pulses have been delivered from the optical pulse generator at different times; and a determination unit for monitoring whether the difference between the measurement signals output from the light receiver with respect to the to-be-monitored optical fiber falls within a predetermined allowable range determined with reference to the drift amount corrected by the second arithmetic unit.

11. The optical fiber monitoring apparatus according to claim 10, further comprising:

first and second memories for storing the reference signals output from the light receiver with respect to the returning light from the reference optical fiber to which the optical pulses have been delivered from the optical pulse generator at different times, and third and fourth memories for storing the measurement signals output from the light receiver with respect to the returning light from the to-be-monitored optical fiber to which the optical pulses have been delivered from the optical pulse generator at different times, wherein said first arithmetic unit finds the drift amount of the optical fiber monitoring apparatus using the signals stored in the first and second memories, wherein said second arithmetic unit corrects, in accordance with the drift amount found by said first arithmetic unit, the difference between the signals stored in the third and fourth memories, and wherein said determination unit monitors whether the difference between the measurement signals stored in the third and fourth memory units falls within the predetermined allowable range determined with reference to the drift amount corrected by the second arithmetic unit.

12. The optical fiber monitoring apparatus according to claim 10, further comprising an optical switch for delivering the optical pulses from the optical pulse generator to the reference optical fiber and the to-be-monitored optical fiber in a switching manner.

13. An optical fiber monitoring method for detecting abnormality of a to-be-monitored optical fiber using an optical fiber monitoring apparatus, the method comprising:

preparing a reference optical fiber having a predetermined length;

receiving light returning from the reference optical fiber, to which an optical pulse has been delivered, to obtain a first reference signal, and receiving light returning from the to-be-monitored optical fiber, to which an optical pulse has been delivered, to obtain a first measurement signal;

receiving light returning from the reference optical fiber, to which an optical pulse has been delivered, to obtain a second reference signal, and receiving light returning from the to-be-monitored optical fiber, to which an optical pulse has been delivered, to obtain a second measurement signal;

calculating a drift amount of the optical fiber monitoring apparatus using the first and second reference signals;

correcting, in accordance with the drift amount, a difference between the first and second measurement signals; and monitoring whether the difference between the measurement signals falls within the predetermined allowable range determined with reference to the corrected drift amount.

* * * * *